United States Patent Office 3,231,650
Patented Jan. 25, 1966

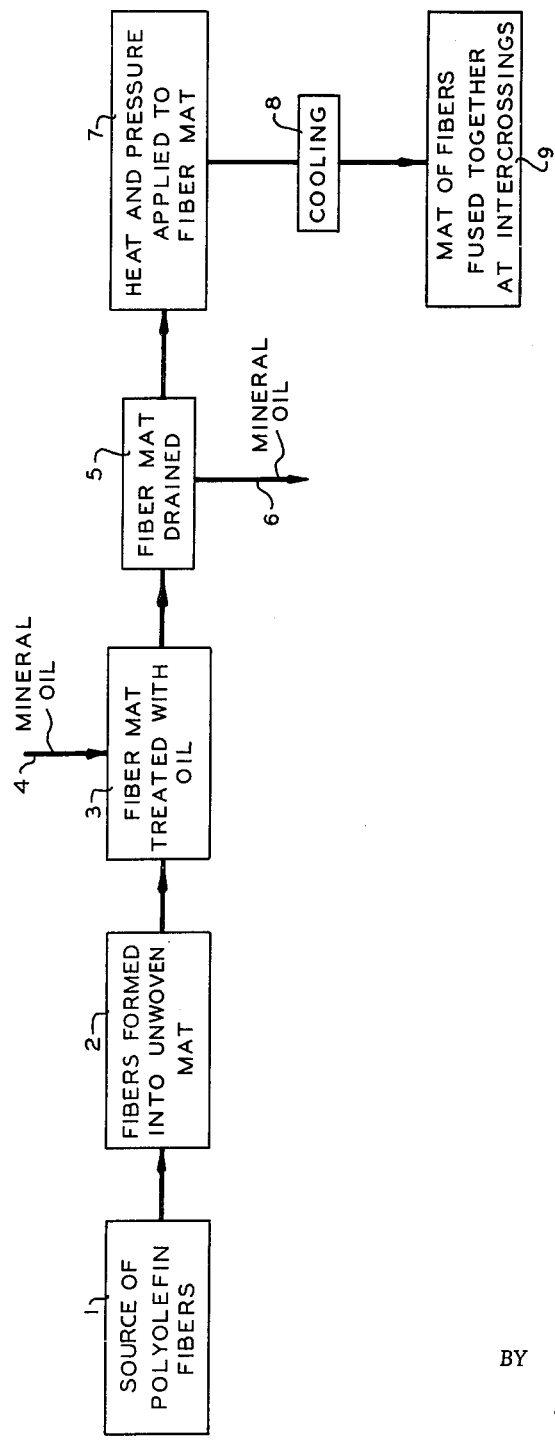

3,231,650
NON-WOVEN POLYOLEFIN FABRICS AND
METHOD OF PREPARING SAME
Robert A. Findlay and John N. Scott, Jr., Bartlesville, Okla., and Anthony Bottomley, Sharon, Mass., assignors to Phillips Petroleum Company, a corporation of Delaware
Filed Mar. 11, 1960, Ser. No. 14,191
6 Claims. (Cl. 264—128)

This invention relates to non-woven polyolefin fabrics. In one aspect it relates to a method of preparing non-woven polyolefin fabrics. In another aspect it relates to fusing together an aggregate of polyolefin fibers to produce a non-woven fabric.

It is known in the art to produce fibers, filaments or threads from polymers of various types by extruding the polymers through orifices or dyes of small diameter. It is also known in the art to produce non-woven fabrics comprising a mass of fibrous material bound together by a bonding agent to unite the fibers into a self-sustaining structure. In such structures the fibers are bound together by the bonding agent at the points of contact. These methods are not adaptable to produce strong non-woven fabrics of polymers of olefins. The properties of inherent resistance to common solvents and smooth surface that have made these polymers of olefins useful in a large variety of fields have made it difficult to form non-woven fabrics by the use of a bonding agent. In those instances where bonding agents have caused some adhesion of polyolefin fibers, the resulting fabric has had the inferior strength of the bonding agent rather than the superior strength of the more tenacious polyolefin fibers.

We have now found that a non-woven fabric may be produced from polyolefin fibers by applying to the points of contact of the fibers a compatible fusing agent, e.g. hydrocarbon oils or polyolefins having softening points not exceeding the softening point of said polyolefin fibers, removing the surplus fusing agent from the fibers, applying external pressure to the mass of fibers while heating at a temperature below the softening point of the fibers for a period of time sufficient to fuse the fibers together at the points of contact, and cooling below the solution temperature of the fiber in the hydrocarbon oil or the softening point of the polyolefin fusing agent. The non-woven fabrics thus produced have a combined strength greatly in excess of the untreated non-woven fabric and find utility as filter cloths, table coverings, automobile side panels, disposable low cost protective coverings, etc.

It is an object of this invention to provide a non-woven fabric of polyolefin fibers. It is another object of this invention to provide a non-woven fabric of polyolefin fibers having the strength of the base fibers.

It is another object of this invention to provide a method for the production of non-woven fabrics of polyolefin fibers.

Yet another object of this invention is to provide a method for fusing together an aggregate of polyolefin fibers at their points of contact to form a non-woven fabric.

Other objects and advantages of this invention will be to those skilled in the art from a consideration of the disclosure.

The starting materials useful in this invention can be characterized as polymers of olefins, preferably said polymers have a density of 0.940 to 0.990; more preferably the density is at least 0.950; more preferably the density is at least about 0.960. Polyethylene having the foregoing densities are preferred starting materials for the process; however, other olefin polymers including copolymers of other olefins and diolefins can be used. It is within the scope of the invention to use fibers of polymers having lower densities, such as the polyethylene fibers produced by the so-called high pressure process, but these fibers have a much lower tensile strength than the higher density polyethylene and thus would have limited utility in non-woven fabrics requiring some useful degree of tensile strength.

A highly satisfactory and often preferred starting material for use in the present invention can be obtained by the process set forth in the patent of Hogan and Banks, Patent No. 2,825,721, issued March 4, 1958. Polymers according to the cited patent are produced by polymerizing a 1-olefin having a maximum chain length of 8 carbon atoms and no branching nearer the double bond than the 4-position by contacting with a solid catalyst containing, as an essential catalytic ingredient, chromium oxide associated with at least one porous oxide selected from the group consisting of silica, alumina, zirconia and thoria. Suitable olefins are ethylene, propylene, 1-butene, 1-pentene and 1-hexene. Copolymers or interpolymers of two or more such olefins can be prepared.

A highly satisfactory starting material for the present invention can be obtained by polymerizing ethylene in admixture with a liquid inert hydrocarbon such as cyclohexane in which is suspended a comminuted catalyst of the type described by Hogan and Banks. It is preferred that the chromium content of the catalyst be within the range 0.1 to 10 weight percent and it is desirable that an appreciable proportion of the chromium be in the hexavalent state. The catalyst can be maintained in suspension in the reaction mixture by any suitable agitation means. The reaction temperature is preferably in the range 250 to 375° F., although temperatures outside this range can be used. A pressure sufficient to maintain the cyclohexane or other solvent substantially in the liquid phase is satisfactory. The reactor effluent is ordinarily heated to obtain maximum solution of polymer in solvent and the catalyst is removed by filtration. The product polymer can be recovered from the resulting solution by vaporization of the solvent and/or cooling to precipitate the polymer from the solvent, and subsequent separation of the precipitated polymer. A polymer produced by the process just outlined will ordinarily have a molecular weight in the range 35,000 to 280,000 and a density in the range 0.950 to 0.970, e.g., approximately 0.960. The tensile strength of the polymer, as produced, will ordinarily be of the order of 4,000 to 5,000 p.s.i., but can be higher or lower. Polymers produced by this process have unsaturation which is preponderantly of the terminal vinyl and/or transinternal structure. So-called "branched vinyl" unsaturation is substantially absent. These terms are more fully discussed in the cited Hogan and Banks patent.

Another suitable, but non-equivalent, method of producing highly crystalline, high density polymers comprises contacting an olefin such as ethylene, propylene, 1-butene, and the like, with a two or more component catalyst wherein one component is an organometal compound, including those where one or more but not all organo groups is replaced by a halogen; a metal hydride; or a metal of Group I, II or III; and the second component is a Group IV to VI metal compound, e.g., salt or alcoholate. A third catalyst component which can be used advantageously is an organic halide or metal halide where the organic radical has thirty or less carbon atoms, and is advantageously an alkyl, cycloalkyl or aryl group. These catalysts are more fully discussed in the patent of W. B. Reynolds et al., Patent No. 2,886,561, issued May 12, 1959, and specific examples of such compounds are disclosed therein. The reaction using these catalysts is preferably carried out in the presence of a hydrocarbon diluent in liquid phase at a temperature in the range from room temperature up to about 300° C. Polymers produced in the presence of these catalysts have molecular weights which can range from 10,000 to 200,000 or higher. They generally have densities of about 0.950.

It will be noted that the foregoing specifications as to density are not satisfied by most of the polyethylenes which were formerly available on the market. Most such polyethylenes have been produced by polymerizations at extremely high pressures, e.g., of the order of 10,000 p.s.i. or higher, usually in the presence of a peroxide type catalyst or without any added catalyst. These materials ordinarily have densities of the order of 0.910 or 0.920. They ordinarily have molecular weights within the general range 5,000 to 30,000 and tensile strength of the order 1,500 to 2,000 p.s.i. The unsaturation in such polymers is preponderantly of the branched vinyl type.

Density as used herein is determined by compression molding a slab of the polymer, cooling said molding at a temperature reduction rate of 15 to 20° F. per minute to room temperature, cutting a pea-sized specimen therefrom, and placing said specimen in a 50-ml. glass-stoppered graduate. Carbon tetrachloride methyl cyclohexane are added to the graduate from burettes in proportion such that the specimen is suspended in the solution. During the addition of the liquids the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73 to 78° F., the balance is adjusted until the pointer is at zero. The value shown on the scale is taken as the specific gravity.

The concept of molecular weight is fully discussed in Hogan and Banks Patent No. 2,825,721, issued March 4, 1958. Unless otherwise specified, the term "molecular weight" as used herein means molecular weight based on inherent viscosity using the Staudinger equation (Molecular weight=$2.445 \times 10^4 \times$ inherent viscosity). Inherent viscosity is determined by measuring the time required for a filtered solution of 0.1000 gram of the polymer in 50 ml. of tetralin (measured at 75° F.) to run through the marked length on a size 50 (0.8 to 3.0 centistokes) Ostwald-Fenske viscosimeter at a temperature of 130° C., the viscosimeter being immersed in a thermostatically controlled oil bath, and measuring also the time required for an equal volume of tetralin containing no polymer to run through the same distance on the same viscosimeter. The inherent viscosity is calculated by the following formula:

$$\eta = \frac{\log V_r}{C}$$

wherein $C=0.183$ and $V_r$=time in seconds required for solution to run through viscosimeter divided by the corresponding time required for the polymer-free tetralin, both at 130° C.

The tensile strength and the elongation were determined by ASTM method D-638-52T except the compression molded specimens correspond to ASTM method D-412-49T, type C.

The solution temperature as used herein is defined as that temperature at which a separate polymer phase appears when a homogeneous mixture or solution of polymer and solvent is cooled. This temperature depends on the identity of the polymer and the solvent. For example the solution temperature for high density polyethylene in isooctane is about 200° F.; while that in cyclohexane is about 180° F.

Softening point is determined by plotting "softness" values vs. temperature. The temperature at which the slope of the resulting curve equals 0.0035 softening units per degree F. is the softening point. "Softness" is determined by the method of Karrer, Davies and Dieterich, Ind. and Eng. Chem., Anal. Ed., 2, 96–99 (1930).

The crystalline freezing point is determined by melting a sample of polymer, inserting a thermocouple into the molten polymer and allowing the molten polymer to cool slowly. The temperature is plotted on a chart versus time. The crystalline freezing point is the first plateau in the time-versus-temperature curve.

The first step according to the process of the present invention subsequent to the production of the desired polymer, is to extrude or otherwise extend the polymer to form a fiber. One method of forming said fibers comprises forcing molten polymer through a small orifice or die. The fiber may then be quenched by exposure to air, nitrogen, etc., but is preferably done by immersing in an inert fluid such as water. The quenched fiber is then ordinarily treated by "cold drawing" which generally signifies that the material is stretched, drawn or elongated at a temperature below the softening point and at a rate such that the fiber does not break. The temperature of the "cold drawing" can range from room temperature up to temperatures slightly below the softening point of the polymer, such as 260° F. for high density polyethylene. The fiber is ordinarily drawn to a length which is from 5 to 10 times the length of the undrawn fiber. The third step that may or may not be taken is a preshrinking step. The "cold drawn" fiber is immersed in a fluid such as water at an elevated temperature below the softening point of the polymer. The fibers recovered from the preshrinking step undergo substantially no further shrinkage during washing or dry cleaning. A highly satisfactory process for the production of fibers or filaments that may be used in this invention is discussed in the copending application of Rufus V. Jones et al., Serial No. 542,877, filed October 26, 1955, now abandoned.

Fibers produced by the above described method or comparable methods are characterized by their high degree of molecular orientation and crystallization. If the softening point of the polymer fiber is not exceeded during subsequent treatment, this high degree of orientation results in a fiber with a high tensile strength. This very high tensile strength and the present invention make it possible to extend the use of non-woven fabrics into fields heretofore unavailable. As hereinbefore discussed, it is within the scope of this invention to use polyolefin fibers having a much lower tensile strength, such as the so-called high pressure polyethylenes which have a tensile strength in the order of 10,000 to 15,000 p.s.i., but fabrics made from such fibers would have little utility. Fibers having the most usefulness in the present invention have a diameter of 0.5 to 30 mils, preferably 1 to 12 mils. High density ethylene polymers have a tensile strength of 50,000 to 125,000 p.s.i., normally 70,000 to 85,000 p.s.i.

Any suitable method may be utilized to produce non-woven webs from fibers. The fibers may be deposited on a slow moving conveyor to form a web or mat of any desired thickness of attenuated and randomly distributed fibers contacting each other at a number of points. A number of layers may be used wherein one layer of fibers crosses the contacting layer which will increase the number of contacts. The tensile strength of the final non-woven fabric will be a function of the number of contacts between fibers as well as the strength of the basic fibers.

The invention is illustrated broadly by the attached simple flow diagram, the various steps being explained by the applied captions.

In one embodiment of the invention, a solution of a polyolefin in a hydrocarbon solvent is applied to the mass of polyolefin fibers formed into a non-woven web as described above; the surplus solution is drained until the solution remains essentially only at the points of contact of the fibers; an external pressure is applied to the aggregate while simultaneously heating at a temperature below the softening point of the fibers but above the solution temperature of the fiber in the solvent, preferably above the softening point of the poilyolefin fusing agent, for a period of time sufficient to fuse the fibers together at their points of contact; and then the heat is removed to permit cooling to below the solution temperature. Additional bonding is provided by the fusing agent which is in intimate contact with the fibers and, upon cooling, hardens to physically join the intercrossed fibers.

The solvents useful in this embodiment are selected on the basis of their solvency for the fiber polymer to be used as well as their volatility since it is highly desirable that the solvent evaporate readily in the fabric production process. For example, suitable solvents for the high density polyethylene, copolymers of ethylene and its homologues and polypropylene include such materials as methylcyclohexane, dimethylcyclohexane and toluene. In addition, such solvents as methylcyclopentane, cyclohexane and benzene may be used for the low density polyethylene and copolymers of ethylene with its homologues. Polymer concentrations may vary from 0.5 weight percent. More preferably, the concentration is in the range 1 to about 5 weight percent.

In a second embodiment of the invention, oils or solutions of oils in hydrocarbon solvents are used in the same manner as the polyolefin solutions in embodiment I. The heating step is carried out at a temperature below the softening point of the fibers, but above the solution temperature of the fiber in the solvent, if one is used, and preferably above the solution temperature of the fiber in the hydrocarbon oil. The oils suitable for use in this embodiment are hydrocarbon oils relatively nonvolatile at the conditions of operation of the fabric production process. Suitable hydrocarbon oils include a wide variety of commercially available oils having wide boiling ranges as well as certain pure hydrocarbons. Again, the particular hydrocarbon oil which will be selected will depend on the softening point and solution points in the oil and solvent of the particular polyolefin fiber to be used and the operating conditions. A suitable compilation for illustrative purposes includes: "Soltrol 130" (isoparaffinic fraction), "Soltrol 170" (isoparaffinic fraction), "Base Oils" (paraffinic fraction), Stoddard Solvent, white mineral oil, n-nonane, n-decane, n-undecane, n-dodecane, n-tridecane, n-tetradecane, 1,2,4-trimethylbenzene, isopropylbenzene, butylbenzene, and 1-phenylbutene-2. Suitable solvents for use in this embodiment of the invention include hydrocarbons having a boiling point slightly above the softening point of the polymer fiber being processed. In the case of high density polyethylene, the hydrocarbon solvent should have a boiling point not exceeding 280° F. Again, it is desired that these solvents evaporate rapidly under conditions of the fabric production process and suitable solvents usable after due consideration is given to the polymer being processed and the operating conditions include: n-pentane, 2,2-dimethylbutane, 2,3-dimethylpropane, isohexanes, isoheptanes, n-heptane, trimethylpentanes, dimethylhexanes, n-octane, dimethylheptane, cyclopentane, methylcyclopentane, cyclohexane, methylcyclopentane, methylcyclohexane, dimethylcyclohexane, n-hexane, 2-methylbutene-2, pentenes, methylpentenes, hexenes, heptenes, trimethylpentenes, n-octene, cyclopentene, cyclohexene, methylcyclohexene, vinylcyclohexene, ethylbenzene, benzene, toluene, and xylene. It should be understood that any mixture of such solvents, including commercially available mixtures, can be utilized.

The fibrous web may be treated with the solution of polyolefin or the hydrocarbon oil by any of the several methods well known in the art. Suitable methods of application include dipping the web into the solution or oil, or spraying of the web with the oil or solution. Any other suitable method may be used that will deposit a quantity of polyolefin or oil at the points of contact of the fibers. A maximum number of points of contact properly supplied with fusing agent results in a maximum increase in strength of the fabric. The fabric is then drained to remove the excess solution of polyolefin or hydrocarbon oil and leave the polyolefin or oil remaining essentially only at the points of contacts of the individual fibers. The drained solution or oil may then be salvaged and used again. The mass of treated fibers is then subjected to a pressure sufficient to produce a maximum number of contacts between the fibers without permanent distortion of the fabric. This external pressure may be applied in any suitable manner so long as the points of contact which have the polyolefin or oil disposed thereon remain in contact for a period of time sufficient to result in the fusion of the contacting fibers when the temperature is reduced to a point below the solution or softening temperature, as the case may be. While only nominal pressure is required, higher pressures are sometimes used to restrain the fibers during the heating step such that a maximum amount of molecular orientation is retained.

During the application of the pressure, the fibers are subjected to a temperature not exceeding the softening point of the fiber but in excess of the solution temperature of the fiber. It is important to the production of non-woven fabrics of polyolefins that the softening point not be exceeded so that the fibers will remain in their highly oriented state and thus retain their original advantage of high tensile strength. However, the temperature shall be in excess of the solution temperature of the fiber polymer in the solvent used for the polyolefin or hydrocarbon oil. For polyolefins broadly, the operating temperature will fall in the range 150 to 350° F. Preferably the temperature will be at least 10° F. less than the softening point. In the case of high density, highly crystalline polyethylene, the preferred operating temperature will be about 220° F. to 225° F., preferably about 240 to 250° F. In the case of the so-called high pressure polyethylenes, this preferred temperature will be about 150° F. to 210° F. In the case of copolymers of ethylene with propylene and 1-butene the preferred temperature range is 150 to 250° F. For highly crystalline polypropylene fibers, the preferred operating temperature range is 150 to 320° F.

The period of time during which these operating conditions will be maintained is a function of several factors including: the hydrocarbon oil or the polyolefin fusing agent used, the fiber or filaments used and their diameters, the density of the mass of polyolefin fibers and the temperature.

We have found that when the fibers in a non-woven mat are treated only with the lower boiling solvents, such as cyclohexane and xylene in the absence of the hydrocarbon oil or polyolefin solution, no fusion of the fibers occurs when subjected to the operating conditions hereinbefore described.

To further describe the advantages of my invention and the specific embodiments thereof, the following examples are set forth:

*Example I*

Polyethylene was produced by the method of Hogan and Banks employing an activated chromium oxide-silica-alumina catalyst containing approximately 2.5 weight percent chromium oxide in cyclohexane at polymerization conditions of 294° F. and 420 p.s.i.g. The polyethylene had a density of about 0.960 and a softening point of about 260° F. The polymer was extruded at 500–550° F. through a filament die and the resulting filament was quenched in water. The filament was then cold drawn using a draw-down ratio of 10 to 1 to produce a 12 mil diameter filament having a tensile strength of about 80,000 p.s.i. The filament was cut into fibers of 1 to 3 inches in length. Fibers thus produced are highly oriented.

These oriented fibers were placed in a cyclohexane containing 5 weight percent white mineral oil and allowed to soak for 15 minutes. The fibers then were drained and the cyclohexane allowed to evaporate at room temperature for several minutes. The fibers were then formed into a non-woven fibrous web which was pressed between polished steel platens (120 in.² area) in a hydraulic press operating at a force of 5 tons (83.3 p.s.i.) for a total of 5 minutes at 250° F. The web was then removed from the platens and permitted to cool to ambient temperature.

Identical oriented high density polyethylene fibers were concurrently formed into a non-woven web similar to the web of the preceding paragraph and subjected to the same temperature and pressure conditions but given no solvent treatment.

When tension was manually applied to the webs, the strength of the solution treated web was estimated to be approximately 10 times that of the control web.

*Example II*

Additional fibers formed as described in Example I were dipped into cyclohexane containing 5 weight percent polyethylene that had been produced by the so-called high pressure process. The fibers were then treated in an identical manner to those in Example I except that the pressure was about 35 pounds or 0.3 p.s.i. A control sample was also made using no solution but otherwise subjecting it to the treatment of this example.

The strength of the solvent treated web was estimated to be 10 times that of the control web when tension was manually applied to the webs.

Oriented fibers formed as above were placed in a container and boiled in cyclohexane at atmospheric pressure for 15 minutes. The fibers were then carefully removed from the liquid bath and allowed to dry for a few minutes before being formed into a non-woven fibrous web. This non-woven web was then placed between polished steel platens. The force exerted by the weight of the top steel platen, i.e., about 35 pounds or 0.3 p.s.i.g. constituted the operating pressure. The platens and the web were maintained at a temperature of 250° F. for a total of 5 minutes and then removed. The above treatment resulted in no fusion whatsoever at the fiber intersections.

The run was duplicated using xylene as the solvent on similar fibers with the same result of no fiber fusing.

Apparently the solvents have too low a boiling point and their use alone results in the complete vaporization of any solvent before the solvent has had an opportunity to affect the polymer fibers at their points of intersection during the heat treatment.

*Example III*

Oriented fibers of high density polyethylene, similar to those used in the preceding examples, is formed into a non-woven web and sprayed with atomized mineral oil. The fabric is then treated in an identical manner to those in Example I. A control web is also produced using the same treatment but given no mineral oil treatment. The treated web results in a fabric much stronger than the control web then tension is manually applied.

*Example IV*

A non-woven web of oriented fibers made from an ethylene copolymer having three weight percent 1-butene incorporated therein having a density of 0.95 and formed in a manner similar to the fibers of Example I are dipped in cyclohexane containing 5 weight percent white mineral oil and then drained for several minutes. The treated web is then placed between platens at 240° F. for 10 minutes; and thereafter removed and permitted to cool. An untreated web of the same copolymer fibers is concurrently placed between platens at 240° F. for 10 minutes. The oil treated web is much stronger than the control web when tension is manually applied.

*Example V*

Polypropylene made using a catalyst system of titanium trichloride and triisobutyl aluminum in accordance with the method of the Reynolds et al. patent and having a density of 0.90 and a softening point of 320° F. is formed into fibers in accordance with the method of Example I. The fibers are treated in the same manner as the fibers of Example IV. Again the oil treated web is made stronger than the control web when tension is manually applied.

It is apparent that the present invention results in a non-woven fabric having a strength considerably in excess of an untreated non-woven fabric. It is also evident that the improved operating conditions have not impaired the orientation of the high density, highly crystalline polyethylene.

It will be apparent to those skilled in the art that variations and modifications of the invention can be made from a study of the foregoing disclosure. Such variations and modifications are believed to be clearly with the spirit and scope of the invention.

What is claimed is:

1. In a method for the manufacture of non-woven polyolefin fabric from polyolefin fibers wherein an aggregate of polyolefin fibers is formed into a non-woven web, the improvement which comprises disposing a hydrocarbon oil having a boiling point in excess of the softening point of said fibers and being a solvent for said fibers at the points of contact of said individual fibers; exerting an externally applied pressure to the non-woven fabric sufficient to cause intimate association of the individual fibers at their contact points; simultaneously heating the aggregate of non-woven polyolefin fibers and hydrocarbon oil at a temperature less than the softening point of the fibers but above the solution temperature of the fiber in the hydrocarbon oil; maintaining said temperature and pressure for a period of time sufficient to fuse the fibers at their points of contact; and removing said heat and pressure.

2. The method of claim 1 wherein said oil is dispersed in a hydrocarbon solvent for said oil which is volatilized at the imposed elevated temperature and pressure.

3. The method of claim 1 wherein said polyolefin fiber is polyethylene having a density of 0.940 to 0.990 gm./cc. and a molecular weight of 35,000 to 280,000; and said oil is white mineral oil.

4. In a method for the manufacture of non-woven polyolefin fabric wherein an aggregate of polyolefin fibers is formed into a non-woven web the improvement which comprises disposing at the points of contact of said individual fibers a mixture of at least one compatible hydrocarbon oil selected from the group consisting of isoparaffinic oils, paraffinic oils, white mineral oil, n-nonane, n-decane, n-undecane, n-tridecane, n-tetradecane, 1,2,4,-trimethylbenzene, isopropylbenzene, butylbenzene and 1-phenylbutene-2 and a hydrocarbon solvent for said oil, said hydrocarbon oil having a boiling point in excess of the softening point of the polyolefin fiber and being a solvent for said fiber and said hydrocarbon solvent being volatilized at the imposed elevated temperature and pressure; draining said aggregate for a period of time sufficient to permit drainage of the surplus mixture; exerting an externally applied pressure to said aggregate of fibers and mixture sufficient to cause intimate association of the contacting points of the individual polyolefin fibers; simultaneously heating the aggregate at a temperature between the softening point of the fibers and the solution temperature of the fiber in the hydrocarbon oil and hydrocarbon solvent mixture for a period of time sufficient to fuse the fibers at their individual points of contact; and removing said heat and pressure thereby forming a strong non-woven fabric of polyolefin fibers.

5. The method of claim 4 wherein said polyolefin fibers are made from high density, highly crystalline polyethylene having a density of 0.940 to 0.990 gm./cc. and a molecular weight of 35,000 to 280,000; said mixture comprises white mineral oil in cyclohexane; and said temperature is 220 to 250° F.

6. The method of claim 4 wherein said polyolefin fibers are made from a polymer of propylene; said mixture comprises white mineral oil in cyclohexane; and said temperature is 150 to 320° F.

References Cited by the Examiner
UNITED STATES PATENTS

| | | | |
|---|---|---|---|
| 895,480 | 8/1908 | Mathiesen | 28—80 |
| 926,996 | 7/1909 | Morris | 28—80 |
| 1,211,228 | 1/1917 | Price | 28—73 |
| 1,712,002 | 5/1929 | Heany | 28—73 |
| 2,628,172 | 2/1953 | Jenett. | |
| 2,689,199 | 9/1954 | Pesce | 154—46 |
| 2,795,290 | 6/1957 | Butsch et al. | |
| 2,813,051 | 11/1957 | MacHenry | 156—201 |
| 3,049,466 | 8/1962 | Erlich | 161—252 |
| 3,117,903 | 1/1964 | Hix | 156—158 |

OTHER REFERENCES

Technology of Adhesives by John Delmonte, published 1947, page 405, lines 37–39.

EARL M. BERGERT, *Primary Examiner.*

D. W. PARKER, *Examiner.*